United States Patent
Aguilar

(10) Patent No.: US 9,841,114 B1
(45) Date of Patent: Dec. 12, 2017

(54) HYDROCARBON PIPELINE PRESSURE SAFETY RELIEF BYPASS SYSTEM

(71) Applicant: Alfredo Lozano Aguilar, San Angelo, TX (US)

(72) Inventor: Alfredo Lozano Aguilar, San Angelo, TX (US)

(*) Notice: Subject to any disclaimer, the term of this patent is extended or adjusted under 35 U.S.C. 154(b) by 29 days.

(21) Appl. No.: 14/956,294

(22) Filed: Dec. 1, 2015

Related U.S. Application Data

(60) Provisional application No. 62/086,141, filed on Dec. 1, 2014.

(51) Int. Cl.
| F16K 17/14 | (2006.01) |
| F16K 17/40 | (2006.01) |
| F16K 15/02 | (2006.01) |
| F16L 41/02 | (2006.01) |
| F16L 29/00 | (2006.01) |

(52) U.S. Cl.
CPC ............ *F16K 17/403* (2013.01); *F16K 15/02* (2013.01); *F16L 29/007* (2013.01); *F16L 41/02* (2013.01)

(58) Field of Classification Search
CPC ...... F16K 17/30; F16K 17/403; F16L 29/007; F16L 41/02
USPC ................................................... 137/68.19–7
See application file for complete search history.

(56) References Cited

U.S. PATENT DOCUMENTS

| 4,079,854 A | 3/1978 | Shaw | |
| 4,085,764 A * | 4/1978 | Raidl, Jr. | ................ F16K 17/16 137/312 |
| 4,301,938 A | 11/1981 | Wood et al. | |
| 2013/0126152 A1* | 5/2013 | Banks et al. | ............ E21B 43/26 166/53 |

\* cited by examiner

*Primary Examiner* — Craig Schneider
*Assistant Examiner* — P. Macade Nichols
(74) *Attorney, Agent, or Firm* — Law Office of Sam Sokhansanj PLLC

(57) ABSTRACT

A method, system, and apparatus are provided for a safety relief bypass system for an oil pumping pipeline that provides pressure relief to the pipeline in order to prevent and reduce pipeline rupture. More specifically, the bypass system can include one or more rupture discs having a specific burst pressure that allows fluids under pressure to bypass through alternative pipeline thereby preventing damage to other piping components.

15 Claims, 5 Drawing Sheets

HYDROCARBON PIPELINE PRESSURE SAFETY RELIEF BYPASS SYSTEM

CROSS REFERENCE TO RELATED APPLICATIONS

This application claims the benefit of U.S. Provisional Application No. 62/086,141 filed on Dec. 1, 2014, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Safety pressure relief devices, such as rupture discs, are frequently used in the protection of pressure vessels or other equipment wherein dangerous pressures may occur. More particularly, rupture discs generally relate to a frangible disc designed to rupture at a predetermined pressure differential. A rupture disc is dome-shaped and usually positioned between the high and low pressure sides of a device, with the high pressure acting upon the face of the diaphragm or disc, so that when the pressure rises toward the danger point, the disc ruptures at the predetermined pressure for which it was designed, thereby relieving the excessive pressure.

It is common in the oil industry to use polyethylene piping, such as piping offered from Polypipe®, however, other types of piping can also be used. During oil drilling and pumping activities from a wellhead or from production batteries, these pipes can come under sudden or extreme pressure. Often times, these pressures can exceed the maximum allowable pressure under normal working conditions. This excess pressure can typically result from plugged or frozen headers at the production battery. The excess pressure can subsequently cause pipe rupture, leakage, and/or damage to one or more pipes or to other parts/components of the pipeline system, such as valves, joints, etc. Hence, damage to such pipeline will require shutting down the drilling, pumping, and/or production for one or more days and weeks for repair and/or replacement of the pipeline and/or clean up of the land.

Hence, what is needed is pipeline configuration and bypass system that can reduce or eliminate the occurrence of a pipeline rupture for an oil production facility, and in the case of a rupture allow for an easy and quick repair of the pipe without stopping production.

BRIEF SUMMARY

In one aspect of the present disclosure described herein, a method, system, and apparatus are provided for a safety relief bypass system for an oil pumping pipeline that provides pressure relief to the pipeline in order to prevent and reduce pipeline rupture. More specifically, in one embodiment, the bypass system can include one or more rupture discs having a specific burst pressure that allows fluids under pressure to bypass through alternative pipeline thereby preventing damage to other piping components.

In another aspect of the disclosure described herein, a system for relieving pressure within a pipeline is disclosed. Here, the system can include a union assembly comprised of a first half, a second half, and a dome-shaped rupture disc disposed between the first half and second half, wherein the rupture disc further include a pre-defined pressure threshold rupture point. The union assembly ca be further coupled to an at least three-way joint coupling, a first tubular pipe coupled to the three-way joint coupling and a second tubular pipe coupled to the three-way going coupling, the first pipe, three-way joint, and second pipe configured to receive a hydrocarbon fluid. In addition, the system can include a third tubular pipe coupled to the union assembly, a pressure gauge coupled the second tubular pipe, and wherein the third tubular pipe is configured to divert high pressure fluid from the first pipe, three-way joint, and second pipe upon the hydrocarbon fluid exceeding the pre-defined threshold pressure of the the rupture disc within the union assembly.

The system can further include wherein the rupture disc further includes a convex or concave dome, the convex or concave portion adjacent to the hydrocarbon fluids. In addition, the first pipe can be further coupled to a check valve or shut-off valve. The third pipe can be further coupled to a check valve or shut-off valve. In addition, the shut-off valve is configured to prevent the flow of hydrocarbon fluid three the three way joint. Here, the first pipe is further coupled to well-head, and the third pipe is a flexible hose.

In another aspect of the disclosure described herein, a method of relieving pressure within a pipeline is disclosed. The method can include assembling a union assembly including a first half, a second half, and a dome-shaped rupture disc disposed between the first half and second half, wherein the rupture disc further including a pre-defined pressure threshold rupture point. The method can further include coupling the union assembly further to an at least three-way joint coupling, coupling a first tubular pipe to the three-way joint coupling and a second tubular pipe coupled to the three-way going coupling, the first pipe, three-way joint, and second pipe configured to receive a hydrocarbon fluid. In addition, the method can include coupling a third tubular pipe to the union assembly, coupling a pressure gauge to the second tubular pipe, and flowing hydrocarbon fluids from a hydrocarbon source, well-head, or production tank battery through the first pipe, three-way joint, and second pipe, wherein the third tubular pipe is configured to at least partially divert the hydrocarbon fluids from the first pipe, three-way joint, and second pipe upon rupturing of the rupture disc within the union assembly.

The method can further include wherein the first pipe is further coupled to a check valve or shut-off valve, and wherein the third pipe is further coupled to a check valve or shut-off valve. In addition, the shut-off valve can be configured to prevent the flow of hydrocarbon fluid three the three way joint. Further, the first pipe can be further coupled to the well-head. In addition, the third pipe can be a flexible hose with a quick connect or disconnect end.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 3AA illustrates a partial cross-sectional diagram of a T-joint for another non-limiting embodiment for a method and system of operation of the rupture disc of the present disclosure described herein, in normal operation, with the rupture disc concave face facing a high pressure side.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Figure 1A:
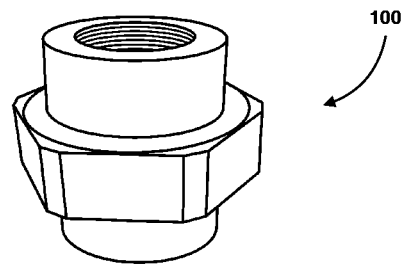
FIG. 1A illustrates a perspective view of one non-limiting embodiment of a rupture disc union assembly of the disclosure described herein.
Figure 1B:
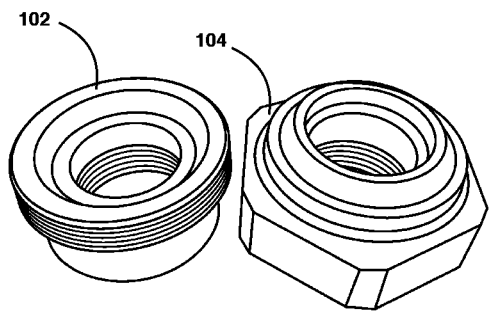
FIG. 1B illustrates a perspective view of the rupture disc union assembly, showing first and second half in disassembled form of the disclosure described herein.
Figure 1C:
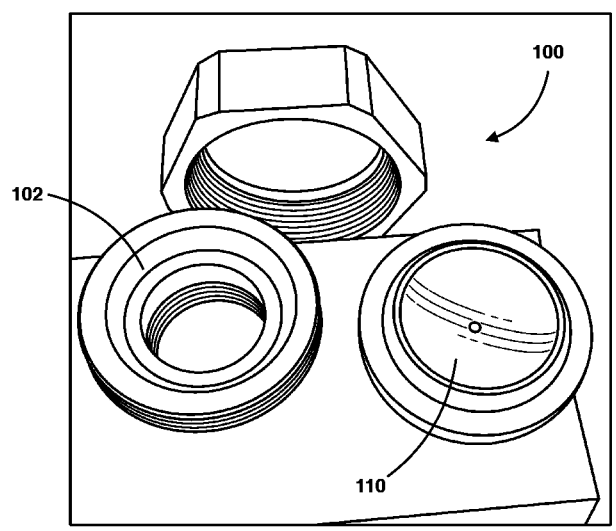
FIG. 1O illustrates a perspective view of the disassembled rupture disc union assembly, showing a rupture disc of the disclosure described herein.

FIG. 1A-1C illustrates various views of a rupture disc holder union assembly 100. FIG. 1A illustrates the union assembly 100 as assembled, and FIGS. 1B-1C illustrate the union assembly 100 in disassembled form. Specifically, union assembly 100 is comprised of a first half 102 and second half 104 having a rupture disc 110 positioned, disposed, and tightly secured between the two halves or within. Here, first half 102 and second half 104 are threaded secured to each other thereby securing disc 110 therein and axially aligning disc 110 there. In one embodiment, as shown in FIGS. 3A-3C and 4B, one end of the assembly 100 can then couple to a T-joint and another end to a pipe 310, such as a flexible high pressure flex hose or Polypipe® for fast connection to the T-joint or union assembly 100. Here, in one embodiment, the union assembly 100 can be a 2 inch configuration. In other embodiments, the union assembly can have a total length of approximately 2-6 inches and/or a width or diameter from 2-6 inches. In certain embodiments, the union disc holder assembly can be configured for 0.5 inch, 1 inch, 1.5 inch, and 2 inch pipes, having threaded inlet and outlet connections. It can be made of carbon steel and 316 Stainless Steel. Further, the union assembly 100 and disc 110 can operate within service temperatures of approximately 100 degrees Fahrenheit up to and including 1,000 degrees Fahrenheit, and pressure ratings of 240 PSIG up to and including 6,000 PSIG. However, it is contemplated within the scope of the disclosure described herein that the union assembly and/or rupture disc can be of any size or dimension configured for any type of pipe or pipeline configuration, be of any suitable material, and operate within any type of temperature or pressure rating.

Figure 2A:
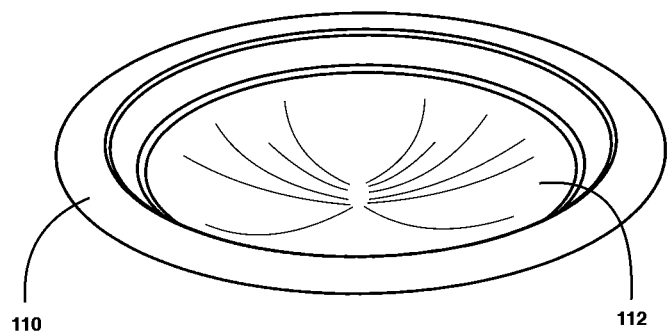
FIG. 2A illustrate a perspective view of the rupture disc of the disclosure described herein.
Figure 2B:
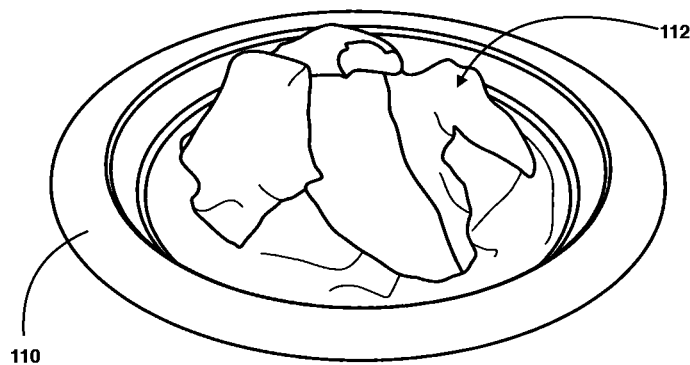
FIG. 2B illustrates a perspective view of the rupture disc shown after it has ruptured by exceeding its pressure threshold.
Figure 3A:
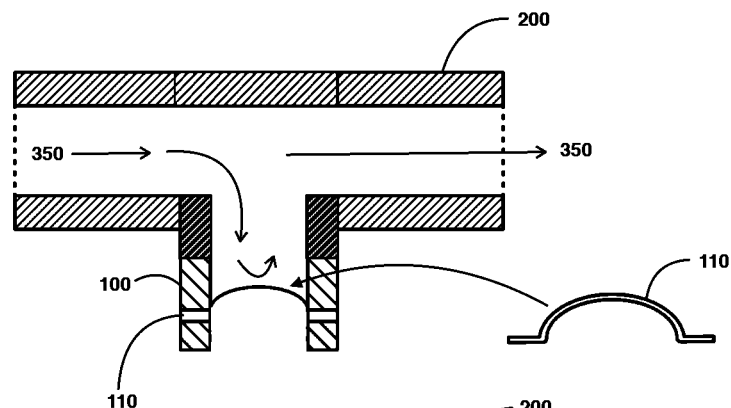
FIG. 3A illustrates a partial cross-sectional diagram of a T-joint for one non-limiting embodiment for a method and system of operation of the rupture disc of the present disclosure described herein, in normal operation, with the rupture disc convex face facing a high pressure side.
Figure 3A:
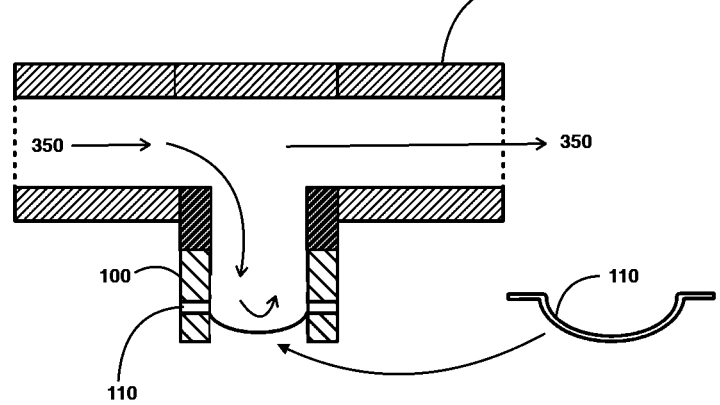
Figure 3B:
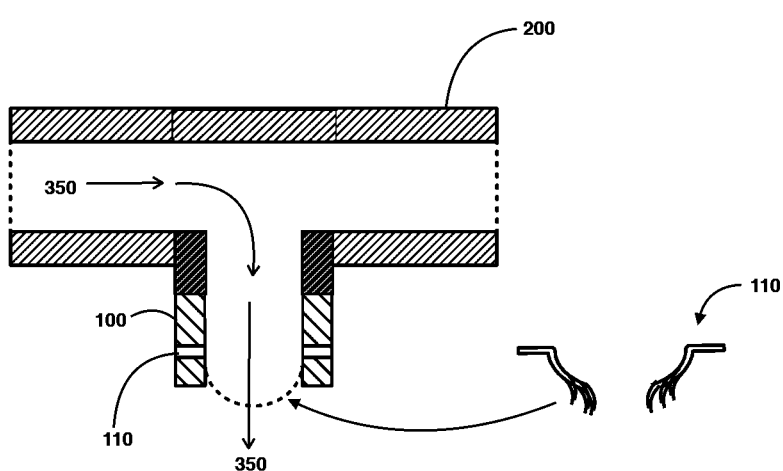
FIG. 3B illustrates a partial cross-sectional diagram of FIG. 3B, illustrating the rupture of the disc upon excessive pressure in the T-joint.

FIGS. 2A-2B illustrate various views for one embodiment of the rupture disc assembly. Here, rupture disc 110 is shown having a concave or convex dome-shape 112 and positioned within union assembly 100 between the high and low pressure sides of a pipeline configuration, with the high pressure fluid (or positive pressure) acting upon the concave or convex face 112 of the diaphragm or disc 110, as shown in FIG. 3A, so that when the pressure rises toward the danger point or predefined pressure threshold, the disc ruptures at the predetermined pressure for which it was designed, thereby relieving the excessive pressure in the pipeline, as shown in FIG. 2B and FIG. 3B. In the current embodiment, the disc 110 is designed to bust or rupture at or beyond approximately 185 PSIG at approximately 72 degrees Fahrenheit and has an outside diameter of approximately 4 inches and an inside diameter of approximately 2-3 inches. Here, the rupture disc can also be configured for burst pressures of 2 PSIG up to and including 30,000 PSIG. In addition, it can be made of Nickel-200/201, Inconel-600, Monel-400, Hastelloy C-276, 316 stainless steel, and/or aluminum. However, it is contemplated within the scope of the disclosure described herein that the rupture disc may be of any size or dimension configured for any type of pipe or pipeline configuration, be of any suitable material, and operate within any type of temperature or pressure rating.

Figure 3C:
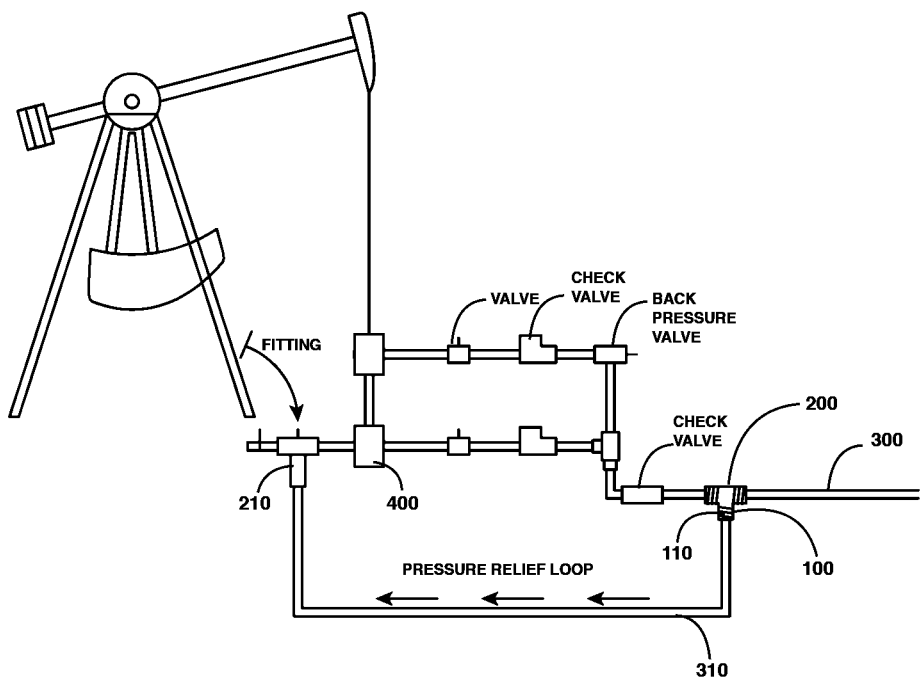
FIG. 3C illustrates a schematic diagram for one non-limiting embodiment of a system and method of operation for a pipeline configuration having the rupture disc union and a pressure relief bypass assembly.
Figure 4A:
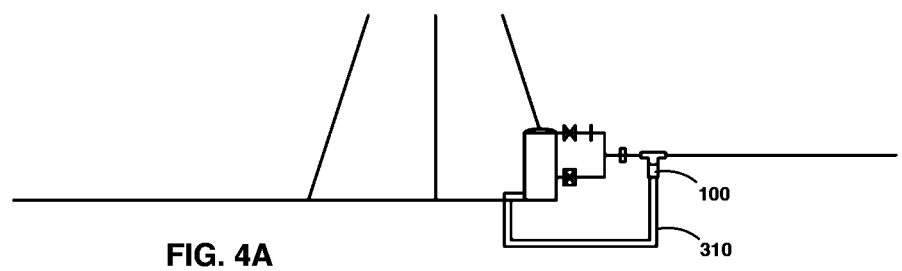
FIG. 4A illustrates an overview schematic diagram for another non-limiting embodiment of a pipeline configuration having the rupture disc union and pressure relief bypass assembly.
Figure 4B:
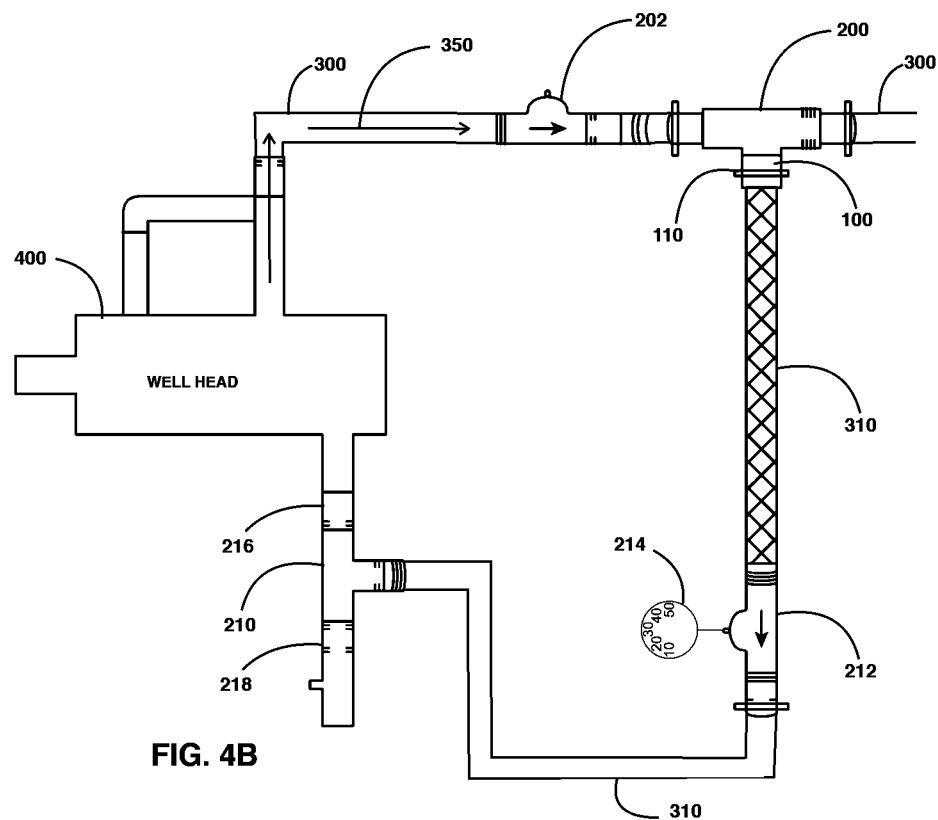
FIG. 4B illustrates a more detailed schematic diagram view for another non-limiting embodiment of a pipeline configuration having the rupture disc and pressure relief bypass system of the disclosure described herein.

FIGS. 3A-3C and 4A-4B illustrate in one or more embodiments a system and method of operation of a pressure relief bypass system incorporating the rupture disc and union disc holder assembly of the present disclosure described herein. In the current embodiment, the pressure relief bypass system can be comprised of generally union assembly 100 having rupture disc 100, T-joint 200, piping 310, and check valve 212 and gauge 214. Here, in one embodiment, during normal operating conditions (FIG. 3A, FIG. 3AA), hydrocarbons 350 such as oil, gas, and fluids are delivered from wellhead casing, hydrocarbon source, or production tank battery 400 the pipeline and through check valve 202 through piping 300. During normal operation, there are generally no fluids running through piping 310, wherein piping 310 provides a pressure relief loop. However, in the case that pressure builds up within or around any of the piping system 300 and 200 due to various circumstances such as plugged, clogged, or frozen productions headers and piping, then the bypass relief system and union valve assembly 100 of the present disclosure described herein can prevent other pipes from becoming damaged due to the excess pressure. Specifically, the excess pressure, such as above approximately 185 PSIG, will cause the frangible dome of the rupture disc 110 within union 100 to burst (FIG. 3B) thereby allowing a bypass for hydrocarbon fluids 350, wherein fluids 350 will take the path of least resistance. At this stage (upon rupture of disc 110), the fluids will begin to flow through T-joint 200 and through piping 310, check valve 212, joint 210, and circulate through casing 400 and continue to circulate through a semi-closed loop system of the bypass pass relief system, as shown in FIGS. 3B, 3C, and 4B.

Here, the bypass relief system of the present disclosure described herein can provide a method for an operator to determine if the rupture disc 110 has been ruptured and the bypass system activated. Specifically, a pressure gauge read-out 214 on joint or valve 212 will visually indicate a rise in pressure through valve 212 thereby prompting the operator that the bypass system has been activated due to extreme pressure through the pumping and/or production pipeline system. In one embodiment, gauge 214 can be a 100 PSIG gauge or any other suitable gauge. When the rupture disc 110 needs replacement, an operator can shut off valve 202, valve 212, or any other valve that will isolate flow through rupture disc 110, thereby allowing disc 110 to be replaced and normal pumping operations resumed. For example, the pressure relief system may also include a another T-joint 210 coupling to piping 310, wherein T-joint 210 may also have a check or shut-off valves 216 and 218 to further isolate or divert hydrocarbons 350 within piping 310. Here, the bypass system and the shut-off the valves can allow the operator to further replace or repair one or more damaged pipes, pumps, well heads, or production batteries, without requiring a complete shut-down or stoppage of hydrocarbon or oil production. Alternatively, one or more sensors may also be employed to detect high pressure, the rupture of the rupture disc, or fluid flowing through bypass line or piping 310.

From the foregoing it will be seen that the disclosure described herein is one well adapted to attain all ends and objectives herein-above set forth, together with the other advantages which are obvious and which are inherent to the disclosure described herein.

Since many possible embodiments may be made of the disclosure described herein without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the disclosure described herein is not limited to the specific forms or arrangement of parts described herein, except insofar as such limitations are included in the following claims. Further, it will be understood that certain features and sub-combinations are of utility and may be employed without reference to other features and sub-combinations.

What is claimed is:

1. A system for relieving pressure within a pipeline, the system comprised of:
    a union assembly comprised of a first half, a second half, and a dome-shaped rupture disc disposed between the first half and second half, wherein the rupture disc further comprises a pre-defined pressure threshold rupture point;
    the union assembly further coupled to an at least three-way joint coupling;
    a first tubular pipe coupled to the three-way joint coupling and a second tubular pipe coupled to the three-way joint coupling, wherein the first pipe, three-way joint coupling, and second pipe are configured to receive a hydrocarbon fluid from a well head assembly;
    a third tubular pipe coupled to the union assembly;
    a pressure gauge coupled to the third tubular pipe; and
    wherein the third tubular pipe is configured to divert the hydrocarbon fluid from the first pipe, three-way joint coupling, and second pipe upon the hydrocarbon fluid exceeding the pre-defined threshold pressure of the rupture disc within the union assembly, wherein the third tubular pipe further diverts the received hydrocarbon fluid back to the well head assembly in a circulating semi-closed loop configuration.

2. The system of claim 1, wherein the rupture disc further comprises a convex dome, wherein a convex portion of the convex dome is adjacent to the hydrocarbon fluid.

3. The system of claim 1, wherein the first pipe is further coupled to a check valve or shut-off valve.

4. The system of claim 1, wherein the third pipe is further coupled to a check valve or shut-off valve.

5. The system of claim 3, wherein the shut-off valve is configured to prevent the flow of hydrocarbon fluid through the three way joint coupling.

6. The system of claim 1, wherein the first pipe is further coupled to a hydrocarbon source or a production tank.

7. The system of claim 1, wherein the third pipe is a flexible hose.

8. A method of relieving pressure within a pipeline, the method comprised of:
    assembling a union assembly comprised of a first half, a second half, and a dome-shaped rupture disc disposed between the first half and second half, wherein the rupture disc further comprises a pre-defined pressure threshold rupture point;
    coupling the union assembly further to an at least three-way joint coupling;
    coupling a first tubular pipe to the three-way joint coupling and a second tubular pipe coupled to the three-way joint coupling, wherein the first pipe, three-way joint coupling, and second pipe are configured to receive a hydrocarbon fluid from a well head or hydrocarbon production assembly;
    coupling a third tubular pipe to the union assembly;
    coupling a pressure gauge to the third tubular pipe; and
    at least partially diverting the hydrocarbon fluid from the first pipe, three-way joint coupling, and second pipe upon rupturing of the rupture disc within the union assembly via the third tubular pipe back to the well head or hydrocarbon production assembly, first pipe, or second pipe in a circulating loop configuration.

9. The method of claim 8, wherein the first pipe is further coupled to a check valve or shut-off valve.

10. The method of claim 8, wherein the third pipe is further coupled to a check valve or shut-off valve.

11. The method of claim 8, wherein the shut-off valve is configured to prevent the flow of hydrocarbon fluid through the three way joint coupling.

12. The method of claim 8, wherein the first pipe is further coupled to the hydrocarbon source.

13. The method of claim 12, wherein the hydrocarbon source is a production tank battery.

14. The method of claim 8, wherein the third pipe is a flexible hose.

15. A system for relieving pressure within a pipeline, the system comprised of:
   a rupture assembly having a dome-shaped rupture disc, wherein the rupture disc further comprises a pre-defined pressure threshold rupture point;
   a first tubular pipe;
   a second tubular pipe, wherein the first tubular pipe, second tubular pipe, and rupture assembly meet at a joint, and wherein the first tubular pipe, second tubular pipe, and rupture assembly receive a hydrocarbon fluid from hydrocarbon production equipment;
   a third tubular pipe coupled to the rupture assembly; and
   wherein the third tubular pipe is configured to divert the hydrocarbon fluid from the first pipe, second pipe, and rupture assembly upon the hydrocarbon fluid exceeding the pre-defined threshold pressure of the rupture disc within the rupture assembly, wherein the third tubular pipe operates as a bypass line and diverts the hydrocarbon fluid in a circulating loop configuration.

* * * * *